Oct. 20, 1970 W. E. HOEHNE 3,534,599
EXPENDABLE OCEAN-WAVE METER
Filed April 12, 1968 2 Sheets-Sheet 1

Walter E. Hoehne
INVENTOR.

BY Dayward N. Mann
Q. Baxter Warner
ATTORNEYS

Oct. 20, 1970  W. E. HOEHNE  3,534,599
EXPENDABLE OCEAN-WAVE METER
Filed April 12, 1968  2 Sheets-Sheet 2
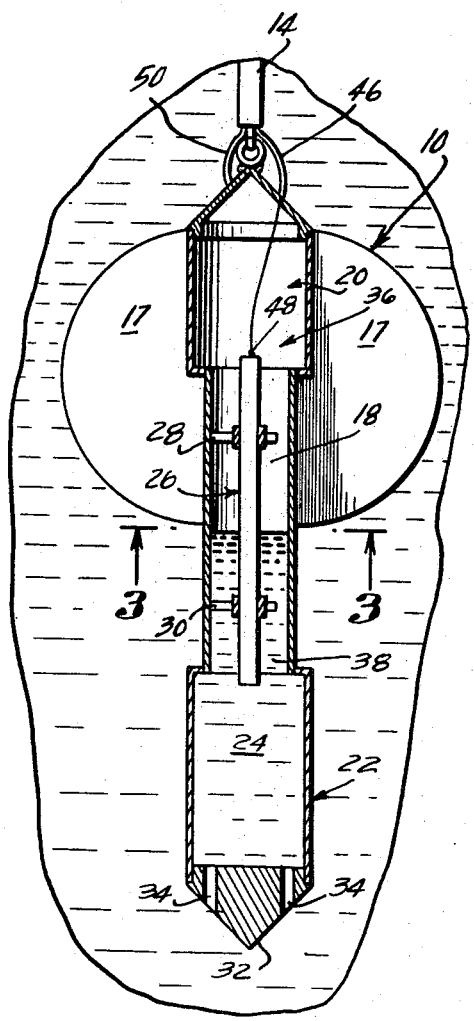
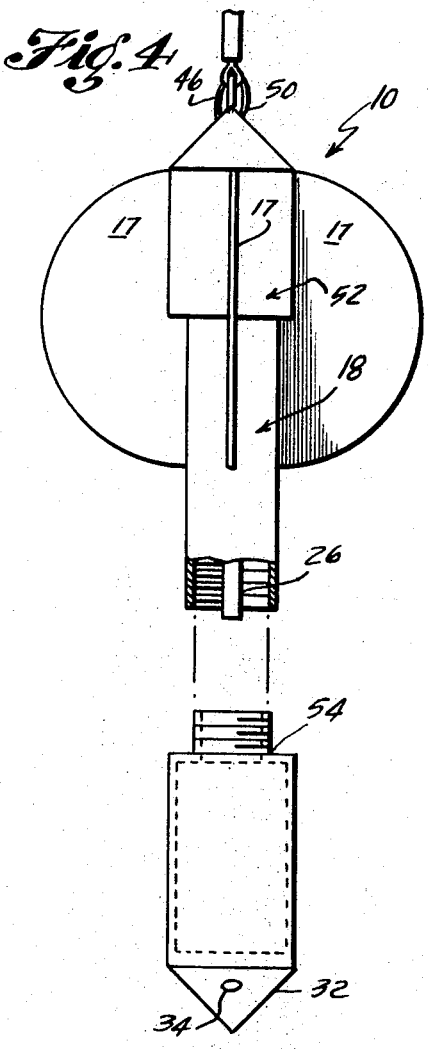
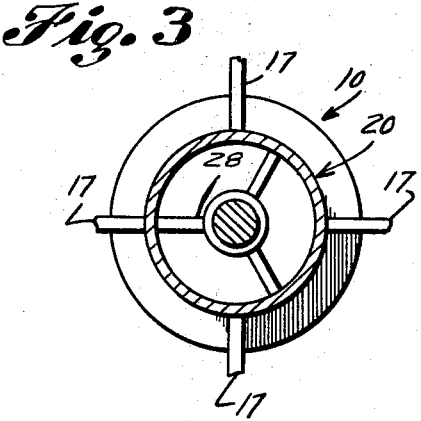
Walter E. Hoehne
INVENTOR.
BY
ATTORNEYS

United States Patent Office 3,534,599
Patented Oct. 20, 1970

---

3,534,599
EXPENDABLE OCEAN-WAVE METER
Walter E. Hoehne, Fairfax, Va., assignor to the United States of America as represented by the Secretary of the Navy
Filed Apr. 12, 1968, Ser. No. 720,966
Int. Cl. G01l 7/18
U.S. Cl. 73—170                                    5 Claims

ABSTRACT OF THE DISCLOSURE

A cylindrical pressure-sensing element is suspended from a floating element containing a transmitter. The pressure on the sensing element will be greater when the floating element is in a trough than when the floating element is on the crest of the wave. Accordingly such changes in pressure alter the height of water within the sensing element changing the electrical resistance therein. This resistance value is relayed to the transmitter where it is broadcast to a receiving station.

---

The invention described herein may be manufactured and used by or for the Government of the United States of America for governmental purposes without the payment of any royalties thereon or therefor.

BACKGROUND OF THE INVENTION

Field of the invention

This invention relates to devices for measuring the amplitude of waves and more particularly relates to devices for measuring the height of waves in the open sea which telemeter such measurements to a receiving station.

Description of the prior art

The knowledge of wave structure on the ocean surface is vital for competent investigation of radar scatter and clutter, multipath communications and for operations or systems affected by ocean surface conditions. At present when tests are to be conducted in areas remote from fixed oceanographic instrumentation sites, the existing sea conditions are estimated by a shipboard observer or by commonly used ocean wave profile instruments. However, observer estimated sea conditions are inconsistent and do not provide either qualitative or quantitative data. Furthermore the aforesaid instruments are normally placed in position by helicopter means and because of their high cost, they must be retrieved preferably by the same helicopter means. The placement and recovery operations are difficult and hazardous resulting in frequent damage or loss of the instruments. Further such instruments are normally not sufficiently developed to provide adequate information to describe wave climate. Therefore the usefulness of wave measuring instruments in planning and logistic support is severely limited.

SUMMARY OF THE INVENTION

Briefly, the present invention involves a wave meter that is small, light, relatively cheap and expendable. It includes a sensing device which is suspended from a floating buoy containing a transmitter. As the pressure varies within the sensing element depending on whether the floating wave meter is in a trough or is riding the crest of a wave, the electrical resistance in the sensing device also will vary. These varying resistances are relayed to the transmitter for broadcasting to a receiving station.

Accordingly it is an object of the present invention to provide an inexpensive ocean wave meter which can be placed in position by any feasible means and abandoned due to its small cost if recovery is not practical.

Another object of the present invention is to provide an ocean wave meter in which the telemetry is compatible with existing receiving systems.

Another object of the present invention is to provide an ocean wave meter which may be placed in remote ocean areas for provision of qualitative and quantitative ocean surface data.

Other objects, advantages, and novel features of the invention will become apparent from the following detailed description of the invention when considered in conjunction with the accompanying drawings.

BRIEF DESCRIPTION OF THE DRAWINGS

FIG. 2 is a vertical cross section through the sensing device suspended below the buoy.

FIG. 3 is an enlarged similar view of the sensing area portion shown in FIG. 2.

FIG. 4 is a different modification of the invention showing the sensing device in two detachable portions.

DESCRIPTION OF THE PREFERRED EMBODIMENT

Figure 1:
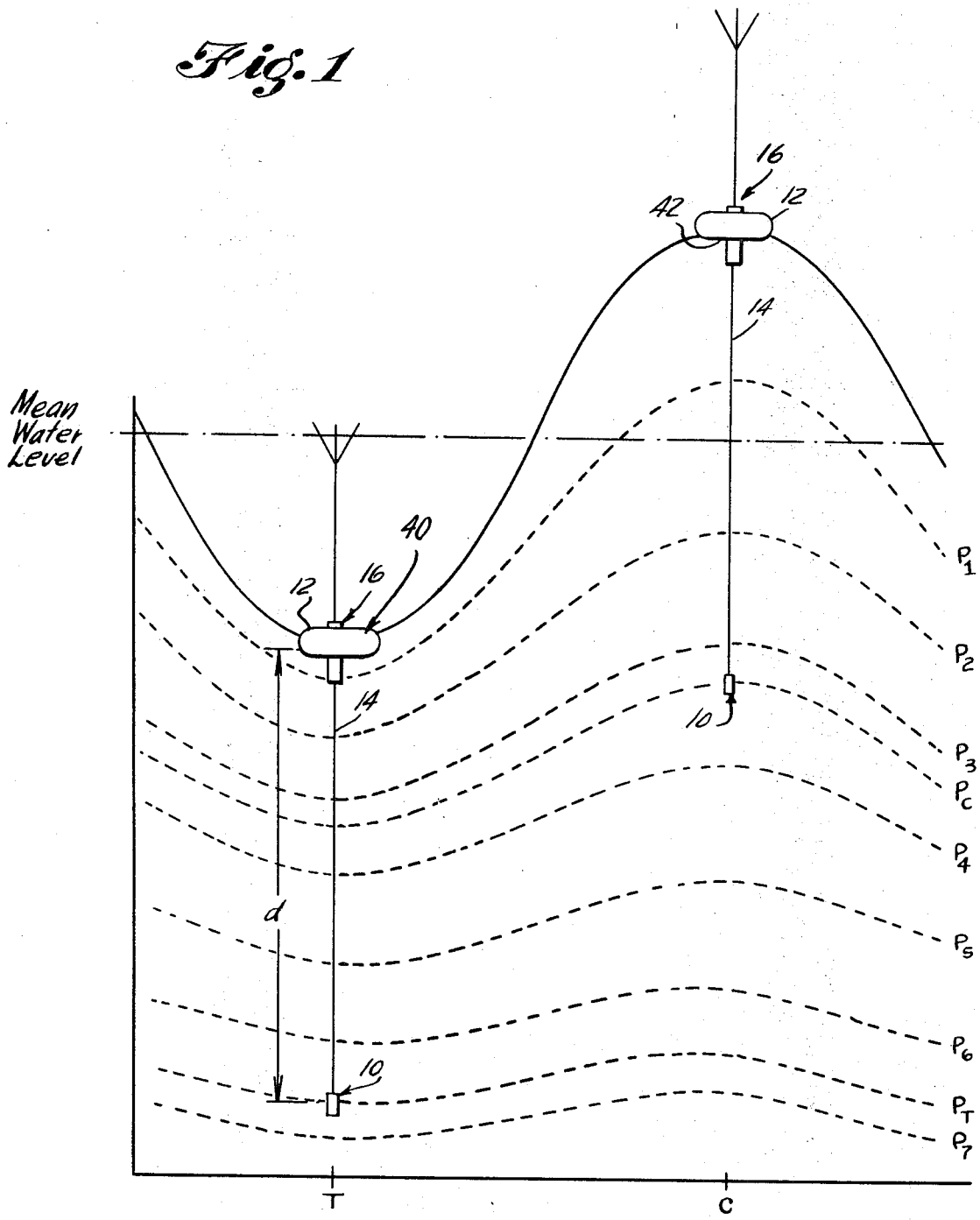
FIG. 1 is a schematic drawing showing the sensing device attached a fixed distance below the buoy floating on the sea surface both within a trough and on a wave crest.

Referring now to the drawings, the invention includes generally the cylindrical sensing device 10 suspended a fixed distance from the buoy 12 by the support cable 14. The buoy 12 contains a telemetering transmitter 16 for broadcasting a signal received from the sensing device 10 to a suitable receiver. Circular shaped fins 17 may be attached to the upper portion of sensing device 10 in order to render stability thereto.

The sensing device 10 as stated above is cylindrical in appearance with a middle portion 18 reduced in diameter as compared to the opposed end portions 20 and 22. The interior of the sensing device 10 is hollow and constitutes the chamber 24 which extends substantially the entire length of the device 10. At one end of the sensing device 10 a support cable 14 is attached which extends to the buoy 12 while at the opposed end a stabilizing weight 32 is positioned. The water inlets 34 are placed on the sensing device 10 immediately adjacent the stabilizing weight 32 and are designed to permit a column of sea water 38 to enter within the expanded area 22 of the chamber 24 and partly within the narrow area 18 thereof. An entrapped volume of air 36 is positioned within the chamber 24 in the expanded area 20 and the volume thereof is controlled by the column of sea water 38 entering the chamber 24 in a manner to be explained later.

Within the chamber 24 and in the area corresponding to the middle portion 18, an elongated sensing rod 26 is axially positioned on non-conductive support rods 28 and 30 respectively. While it may be manufactured from any suitable conductive material it is preferably of carbon or it may be a wire wound helix.

The principle upon which the present invention is based (FIG. 1) is that the water pressure $P_t$ acting on the sensing device 10 will be greater when the buoy 12 is in a trough 40 than the pressure $P_c$ when the buoy 12 is on the crest of a wave at 42. This phenomenon is due to the attenuation of the pressure effect caused by the wave and described by the equation:

$$H_d = e^{-2\pi \frac{d}{l}} H_s$$

where
- $H_d$ = the amplitude of the wave in the pressure surface at some depth below the mean water level.
- $H_s$ = the amplitude of the surface wave.
- $d$ = the depth below the mean water level.
- $l$ = the length of the wave being measured.

The change in pressure of the water on the sensing device 10 between the trough 40 and crest 42 expressed in terms of the height of a water column is:

$$H = 2H_d = P_t - P_c = 2\left(H_s - e^{-2\pi \frac{d}{l}} H_s\right)$$

in which the equation components have been previously identified. $P_t$ is the pressure on the sensing device 10 in the trough 40 and $P_c$ is the pressure at wave crest level 42.

As shown best in FIG. 2, the previously stated volume of entrapped air 36 is positioned in the chamber 24 and is immediately adjacent the column of water 38 within the chamber 24 of the aforesaid sensing device 10. The entrapped air 36 will either compress or expand as the pressure system discussed previously forces the column of water 38 either into or out of the chamber 24 through the inlets 34 and around the sensing rod 26. As the water level 44 moves up and down along the elongated sensing rod 26 positioned axially in the middle portion 18 of the sensing device 10, a varying resistance is obtained in an electrical circuit extending from the transmitter 16 through the electrical cable 46, the connector 48, the sensing rod 26, the sea water 38, the wall of the sensing device 10 through a second electrical cable 50 and back to the transmitter 16 where the aforesaid varying resistance is used to modulate a telemetry signal.

The compression and expansion of the entrapped air 36 are described by the gas equation:

$$\frac{P_t V_t}{T_t} = \frac{P_c V_c}{T_c}$$

where
- $P_t$ = pressure on the sensor when the buoy is in a trough
- $P_c$ = pressure on the sensor when the buoy is on a crest
- $V_t$ = Volume of the entrapped air when the buoy is in a trough
- $V_c$ = Volume of the entrapped air when the buoy is on a crest
- $T_t$ = absolute temperature of the entrapped air when the buoy is in a trough
- $T_c$ = absolute temperature of the entrapped air when the buoy is on a crest Since the volume V is small compared to the volume of the ocean and is in good thermal contact with the surrounding water:

$$T_t = T_c$$

so that $P_t V_t = P_c V_c$ but $P_t = H + P_c$ then $$\frac{V_c}{V_t} = \frac{H + P_c}{P_c}$$

If $P_c$ is measured in feet of water and $P_a$ is the atmospheric pressure in feet of water of approximately 30 feet, therefore $$\frac{V_c}{V_t} = \frac{H + 30 + d - \frac{H}{2}}{30 + d - \frac{H}{2}} = \frac{30 + d + \frac{H}{2}}{30 + d - \frac{H}{2}}$$

$d$ is the length of the cable connecting the sensing device 10 to the surface buoy 12. Hence it is clear that for a given pressure change H, the change in volume of the entrapped air 36 can be calculated. As previously discussed, when the volume of air 36 expands, the water level 44 is forced down the sensor rod 26 and vice versa when the volume of air compresses. This causes the varying resistance in the previously discussed electrical circuit which is connected to the transmitter 16 in the buoy 12.

An additional modification of the invention is to manufacture the cylindrical sensing device 10 into detachable upper portion 52 containing the entrapped air 36 and the sensor rod 26 and a lower portion 54 which fills with water. In this modification a variety of sizes of lower chambers 54 could be manufactured so that a choice in the length of the cable 14 (FIG. 1) could be made to suit the conditions as required.

Obviously many modifications and variations of the present invention are possible in the light of the above teachings. It is therefore to be understood that within the scope of the appended claims the invention may be practiced otherwise than as specifically described.

What is claimed is:

1. An ocean wave meter designed to measure the height of waves in the open sea and to telemeter such measurements to a satisfactory receiver comprising:
   a buoy designed to float on the ocean surface;
   a sensor means suspended from said buoy including a perforated cylinder with an axially mounted sensory rod and with a volume of entrapped air positioned therein, said perforations adapted to allow sea water to enter the cylinder which alters the volume of said entrapped air depending on the position of the cylinder at either crest or trough level and alters the resistance value of the sensor rod; and
   telemetering means located in said buoy and electrically connected to said sensor rod for broadcasting said resistance values to a receiver.

2. The ocean wave meter as defined in claim 1 wherein a fin is attached to said sensor means for stabilizing purposes.

3. An ocean wave meter designed to measure the height of waves in the open sea and to telemeter such measurements to a satisfactory receiver comprising:
   a buoy designed to float on the ocean surface;
   an elongated sensor cylinder suspended at one end a fixed distance from said buoy while the opposed end thereof has sea water openings placed therein to allow sea water to enter within said sensor cylinder, said sensor cylinder having an amount of entrapped air therein which is either expanded or compressed according to the amount of said sea water within said sensor cylinder;
   a sensory rod positioned axially within said sensor cylinder;
   a telemetering transmitter placed within said buoy; and
   an electrical connecting means between said sensing rod and said transmitter;
   thus as the pressure acting on said sensory cylinder varies between the trough and crest level, the amount of water entering the said sensory cylinder varies which either expands or compresses the volume of trapped air and changes the resistance value of the said sensory rod which is relayed through said electrical connecting means to said telemetering transmitter.

4. The ocean wave meter as defined in claim 3 wherein a circular fin is attached to the said sensory cylinder for stabilizing purposes.

5. The ocean wave meter as defined in claim 3 wherein said sensor cylinder is separated into two distinct detachable portions, a first portion of which contains said volume of entrapped air and the said sensory rod whereas the second portion has said sea water openings to permit water to enter therein thus said first portion of said sensory cylinder is provided for use with a variety of second portions of said sensory cylinder in order to change a desired suspension distance between said buoy and said sensory cylinder.

References Cited

UNITED STATES PATENTS

| 2,219,147 | 10/1940 | Binder et al. | 338—94 X |
| 3,113,285 | 12/1963 | Edwards | 73—170 |

FOREIGN PATENTS 140,997  6/1958  U.S.S.R.

JERRY W. MYRACLE, Primary Examiner

U.S. Cl. X.R.

73—304